(12) United States Patent
Sundaresan et al.

(10) Patent No.: US 8,976,696 B2
(45) Date of Patent: Mar. 10, 2015

(54) METHODS AND SYSTEMS FOR INTEGRATING BATCH SCHEDULING WITH EXTERNAL BEAMFORMING

(71) Applicant: NEC Laboratories America, Inc., Princeton, NJ (US)

(72) Inventors: Karthikeyan Sundaresan, Howell, NJ (US); Mustafa Y. Arslan, Princeton, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 156 days.

(21) Appl. No.: 13/676,865

(22) Filed: Nov. 14, 2012

(65) Prior Publication Data

US 2013/0121195 A1    May 16, 2013

Related U.S. Application Data

(60) Provisional application No. 61/559,880, filed on Nov. 15, 2011.

(51) Int. Cl.
*H04W 72/08* (2009.01)
*H04W 72/04* (2009.01)

(52) U.S. Cl.
CPC .......... *H04W 72/085* (2013.01); *H04W 72/046* (2013.01)
USPC ........................................................ 370/252

(58) Field of Classification Search
CPC .................. H04W 72/042; H04W 72/0413
USPC ............... 370/315, 318, 431, 312, 252, 208; 455/522; 375/260
See application file for complete search history.

(56) References Cited

U.S. PATENT DOCUMENTS

2006/0120395 A1*   6/2006   Xing et al. .................... 370/431
2006/0184854 A1*   8/2006   Ihm et al. ...................... 714/749
(Continued)

FOREIGN PATENT DOCUMENTS

WO   WO 2011112132 A1 *   9/2011

OTHER PUBLICATIONS

Andrews, M., et al. "Scheduling Algorithms for Multi-Carrier Wireless Data Systems" ACM MobiCom. Sep. 2007. pp. 3-14.
(Continued)

*Primary Examiner* — Ian N Moore
*Assistant Examiner* — Julie Lequang
(74) *Attorney, Agent, or Firm* — Joseph Kolodka

(57) ABSTRACT

Methods and systems for simultaneous determination of channel resource allocations and beam vectors for uplink frames are disclosed. One method includes receiving batch information from client devices indicating amounts of data to be transmitted on the uplink by the client devices. Further, signal quality can be measured on channel resources for each of the client devices and for each of a plurality of beam vectors. Additionally, rate information for the channel resources for each of the client devices is determined based on signal quality measurements. Moreover, the method includes computing, based on the batch information and the rate information, utilities for allocations of the channel resources to the client devices and for the beam vectors for at least one uplink frame and selecting, based on the utilities, at least one of the beam vectors and at least one of the allocations for transmission of the data on the uplink frame(s).

16 Claims, 4 Drawing Sheets

(56) References Cited

U.S. PATENT DOCUMENTS

| | | | |
|---|---|---|---|
| 2007/0248035 A1* | 10/2007 | Sang et al. | 370/318 |
| 2008/0070585 A1* | 3/2008 | Wu et al. | 455/452.2 |
| 2008/0159122 A1* | 7/2008 | Dor | 370/208 |
| 2008/0198785 A1* | 8/2008 | Huang et al. | 370/312 |
| 2009/0232245 A1* | 9/2009 | Lakkis | 375/267 |
| 2010/0070814 A1* | 3/2010 | Damnjanovic et al. | 714/748 |
| 2010/0104033 A1* | 4/2010 | Gorokhov | 375/260 |
| 2011/0113137 A1* | 5/2011 | Ramachandran et al. | 709/224 |
| 2013/0003583 A1* | 1/2013 | Landstrom et al. | 370/252 |
| 2013/0107977 A1* | 5/2013 | Lakkis | 375/267 |
| 2014/0011529 A1* | 1/2014 | Bergel et al. | 455/501 |

OTHER PUBLICATIONS

Arslan, M. Y., et al. "FERMI: A Femtocell Resource Management System for Interference Mitigation in OFDMA Networks" ACM MobiCom. Sep. 2011. pp. 25-36.

Bai, B., et al. "Uplink Cross-Layer Scheduling With Differential QOS Requirements in OFDMA Systems" EURASIP Journal on Wireless Communications and Networking, vol. 2010, No. 168357. Sep. 2010. pp.1-10.

Bansal, M., et al. "Improved Fully Polynomial Time Approximation Scheme for the 0-1 Multiple-Choice Knapsack Problem" International Institute of Information Technology Tech Report. Mar. 2004.

Calinescu, G., et al. "Maximizing a Submodular Set Function Subject to a Matroid Constraint" Proceedings of the 12th International Conference on Integer Programming and Combinatorial Optimization. Jun. 2007. (15 Pages).

Cisco. "Cisco Visual Networking Index: Global Mobile Data Traffic Forecast Update, 2010-2015" Cisco VNI Forecast, Feb. 2011. pp. 1-27.

Deb, S., et al. "Real-Time Video Multicast in WiMAX Networks" 27th IEEE International Conference on Computer Communications, Joint Conference of the IEEE Computer and Communications Societies. Apr. 2008. pp. 2252-2260.

Fisher, M.L., et al. "An Analysis of Approximations for Maximizing Submodular Set Functions—II" Mathematical Programming, vol. 14, No. 1. Dec. 1978. pp. 73-87.

Fleischer, L., et al. "Tight Approximation Algorithms for Maximum General Assignment Problems" Proceedings of the Seventeenth Annual ACM-SIAM Symposium on Discrete Algorithm, SODA '06. Jan. 2006. pp. 611-620.

Goundan, P.R., et al. "Revisiting the Greedy Approach to Submodular Set Function Maximization" Optimization Online Preprint. Manuscript. 2007. pp. 1-25.

IEEE Standards Association. "Part 16: Air Interface for Broadband Wireless Access Systems—Advanced Air Interface" IEEE Std 802.16m-2011. May 2011. (1106 Pages).

IEEE Standard for Local and Metropolitan Area Networks. "Part 16: Air Interface for Fixed and Mobile Broadband Wireless Access Systems" IEEE Std 802.16e-2005. Feb. 2006. (864 Pages).

Lee, M., et al. "An Adaptive Polling Algorithm With Differentiation Strategy in IEEE 802.16 Multi-Hop Networks With IEEE 802.11E WLANs" 28th International Performance Computing and Communications Conference, IPCCC 2009. Dec. 2009. pp. 354-359.

Lee, S., et al. "Proportional Fair Frequency-Domain Packet Scheduling for 3GPP LTE Uplink" 28th IEEE International Conference on Computer Communications, Joint Conference of the IEEE Computer and Communications Societies. Apr. 2009. pp. 2611-2615.

Nie, C., et al. "Adaptive Polling Service for Next-Generation IEEE 802.16 WiMAX Networks" Proceedings of the Global Communications Conference, GLOBECOM 2007. Nov. 2007. pp. 4754-4758.

Pokhariyal, A., et al. "Frequency Domain Packet Scheduling Under Fractional Load for the UTRAN LTE Downlink" Proceedings of the 65th IEEE Vehicular Technology Conference. Apr. 2007. pp. 699-703.

Song, G., et al. "Cross-Layer Optimization for OFDM Wireless Networks—Part I: Theoretical Framework" IEEE Transactions on Wireless Communications, vol. 4, No. 2. Mar. 2005. pp. 614-624.

Svedman, P., et al. "Opportunistic Beamforming and Scheduling for OFDMA Systems" IEEE Transactions on Communications, vol. 55, No. 5. May 2007. pp. 941-952.

Vutukuru, M., et al. "Cross-Layer Wireless Bit Rate Adaptation" Proceedings of the ACM SIGCOMM 2009 Conference on Applications, Technologies, Architectures, and Protocols for Computer Communications. Aug. 2009. pp. 3-14.

Wei, N., et al. "Performance of MIMO With Frequency Domain Packet Scheduling in UTRAN LTE Downlink" Proceedings of the 65th IEEE Vehicular Technology Conference. Apr. 2007. pp. 1177-1181.

* cited by examiner

METHODS AND SYSTEMS FOR INTEGRATING BATCH SCHEDULING WITH EXTERNAL BEAMFORMING

RELATED APPLICATION INFORMATION

This application claims priority to provisional application Ser. No. 61/559,880 filed on Nov. 15, 2011, incorporated herein by reference.

BACKGROUND

1. Technical Field

The present invention relates to wireless communication methods and systems and, more particularly, to allocation of channel resources and beam pattern selection.

2. Description of the Related Art

Beamforming is supported by certain Orthogonal Frequency-Division Multiple Access (OFDMA) standards, where multiple beam patterns (one per client) are applied in the digital signal space for each client scheduled in the frame. This is called user-level beamforming and the beam patterns are only allowed for application to the data payload in the frame. Another limitation of user-level beamforming is that the standards only specify a limited number of antenna elements, limiting the directionality of beam patterns. External beamforming (or frame-level beamforming) on the other hand applies a beam pattern (common to all clients in the frame) at the radio frequency (RF) level on the entire frame, including the preamble and control payload. In addition, the number of antenna elements is not limited since this is an application of beamforming that is agnostic of the standards support. This permits for the use of a larger number of antenna elements than what is defined in the standards and hence, enables more directional (i.e., focused) beams.

In OFDMA systems, the base stations (e.g., femtocells) carry out the scheduling for both the downlink and the uplink. In the uplink, the clients indicate the amount of data in their transmission buffers to their base station. The base station then allocates sufficient resources for each client. This scheduling is traditionally carried one frame after another (called per-frame scheduling). On the contrary, batch scheduling aggregates client requests over multiple frames and performs the resource allocation accordingly. Batch scheduling allows for more careful optimization at the base station and also reduces the signaling overhead for uplink scheduling requests from clients.

SUMMARY

One embodiment of the present principles is directed to a method for simultaneous determination of channel resource allocations and beam vectors for uplink frames. The method includes receiving batch information from client devices indicating amounts of data to be transmitted on the uplink by the client devices. Further, signal quality can be measured on channel resources for each of the client devices and for each of a plurality of beam vectors in addition, rate information for the channel resources for each of the client devices is determined based on signal quality measurements. Moreover, the method includes computing, based on the batch information and the rate information, utilities for allocations of the channel resources to the client devices and for the beam vectors for at least one uplink frame and selecting, based on the utilities, at least one of the beam vectors and at least one of the allocations for transmission of the data on the uplink frame(s).

Another embodiment is directed to a base station system for simultaneous determination of channel resource allocations and beam vectors for uplink frames. The system includes a receiver, a signal quality measurement module, a controller and a scheduler. The receiver is configured to receive batch information from client devices indicating amounts of data to be transmitted on the uplink by the client devices. In addition, the signal quality measurement module is configured to measure signal quality on channel resources for each of the client devices and for each of a plurality of beam vectors. Further, the controller is configured to determine rate information for the channel resources for each of the client devices based on signal quality measurements. Moreover, the scheduler is configured compute, based on the batch information and the rate information, utilities for allocations of the channel resources to the client devices and for the beam vectors for at least one uplink frame. The scheduler is further configured to select, based on the utilities, at least one of the beam vectors and at least one of the allocations for transmission of the data on the uplink frame(s).

Another embodiment is directed to a communication system including a plurality of client devices and a base station. The client devices are configured to transmit batch information indicating amounts of data to be transmitted on a communication uplink by the client devices and to transmit pilot signals on the uplink. In addition, the base station is configured to receive the batch information from the client devices and to measure signal quality on channel resources for each of the client devices and for each of a plurality of beam vectors from the pilot signals. The base station is further configured to determine rate information for the channel resources for each of the client devices based on signal quality measurements. The base station is also configured to compute, based on the batch information and the rate information, utilities for allocations of the channel resources to the client devices and for the beam vectors for at least one uplink frame and to select, based on the utilities, at least one of the beam vectors and at least one of the allocations for transmission of the data on the uplink frame(s).

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
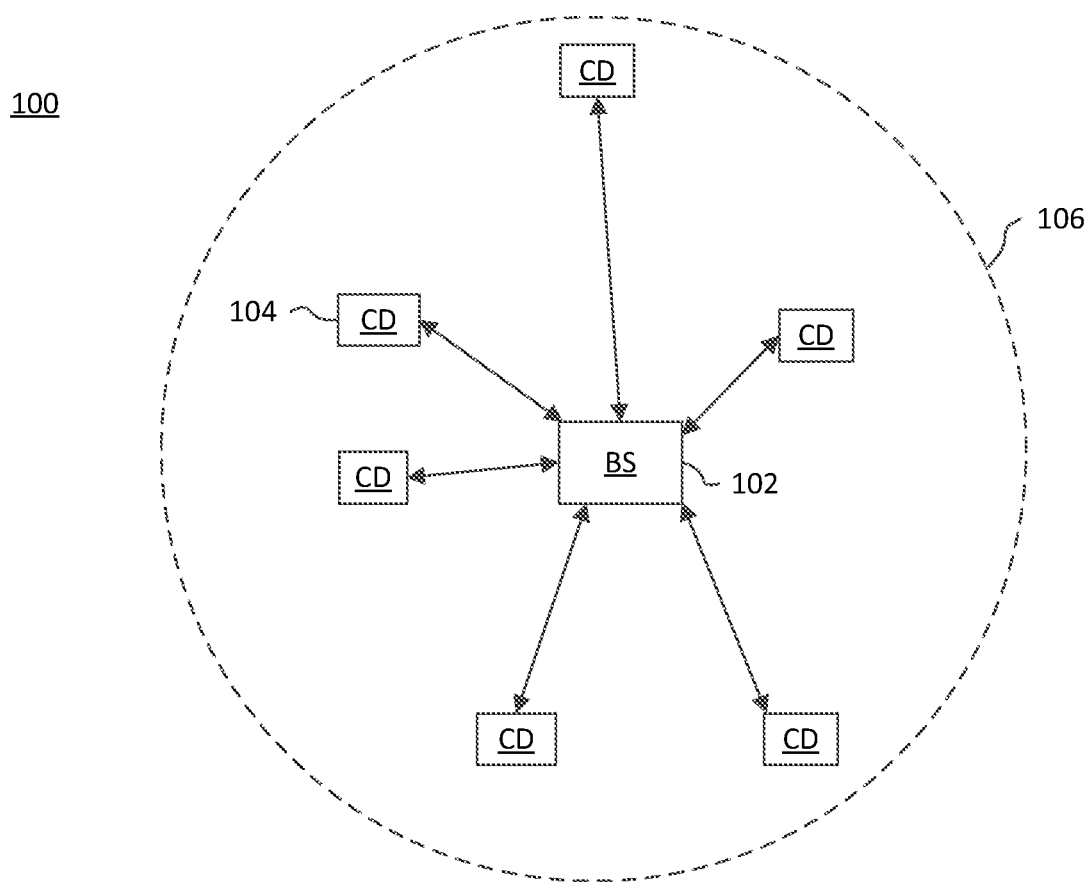
FIG. 1 is a block diagram of an exemplary communication system in which embodiments of the present principles can be implemented.

The integration of frame-level (external) beamforming with downlink scheduling can be accomplished by extending existing solutions. User-level beamforming has been jointly optimized with per-frame scheduling for OFDMA systems. However, the notion of frame-level beamforming and its various benefits have not been explored or contemplated. Its integration with uplink batch scheduling and the challenges associated with the integration have also not been previously considered. The embodiments of the present principles described herein are directed to the design and implementation of an efficient uplink scheduler that integrates frame-level beamforming with uplink batch scheduling for OFDMA.

In the exemplary embodiments described herein, external beamforming is integrated with uplink batch scheduling for OFDMA femtocells. As part of the broad scheme, the present principles allocate sub-channels to mobile stations (clients) across a batch of OFDMA uplink frames, and at the same time determine a beam pattern, common to all clients scheduled in a frame, to be applied on each frame in the batch. The solutions described herein are applicable to OFDMA wireless broadband technologies such as World Wide Interoperability for Microwave Access (WiMAX) and Long Term Evolution (LTE).

The methods and systems described herein maximize the amount of uplink data that can be delivered by the clients of an OFDMA femtocell (base station). In general, exemplary embodiments can solve the problem in four steps: 1) the base station measures the client signal-to-noise ratios (SNRs) for each beam pattern, scheduling each client using all the sub-channels in an OFDMA frame. The SNR represents the signal-to-noise ratio (a metric of wireless link quality) for the signals transmitted by the clients (i.e., in the uplink). 2) The base station constructs a client SNR table for each number of sub-channels. SNR values can be interpolated from the measurements in step 1 and each SNR is mapped to a modulation and coding scheme (MCS). 3) The base station polls each client for the amount of uplink data that needs to be scheduled over a batch of frames. 4) The base station determines the number of sub-channels allocated to each client for each frame in the batch, together with the beam pattern applied to each frame in the batch in accordance with various methods described herein below.

The methods and systems are advantageous in that they provide practical frame-level beamforming solutions that are agnostic of the OFDMA standards. The number of antennas present in the beamforming antenna array is not limited by the standards, in contrast to user-level beamforming. Further, they provide uplink scheduling solutions, which maximize the amount of uplink data delivered by the clients of an OFDMA femtocell that employs frame-level beamforming in accordance with exemplary embodiments.

It should be understood that embodiments described herein may be entirely hardware or may include both hardware and software elements, which includes but is not limited to firmware, resident software, microcode, etc. In a preferred embodiment, the present invention is implemented in hardware and software.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary communication system 100 in which embodiments of the present principles can be implemented is illustratively depicted. The system 100 includes a base station system 102, including, for example, a femtocell, that serves a plurality of client devices or mobile stations 104 in accordance with, for example, an OFDMA scheme, in a service area 106. Here, the base station 102 can transmit data to clients on a downlink and the clients 104 can in turn transmit data to the base station on an uplink. In accordance with exemplary aspects, the base station 102 can implement batch scheduling on the uplink. In batch scheduling, given a polling interval (F frames) and the buffer occupancies of the clients, the problem is to effectively pack (schedule) the out-standing client data jointly over F frames, with potentially different schedules across frames. When batch scheduling is integrated with beamforming in accordance with aspects of the present principles, in addition to packing, a beam is determined for each frame in the batch. Picking a beam for a frame and a subset of clients (for data packing) are intertwined here, as the beam choice for a frame will affect the rate supported by clients in that frame and, hence, the amount of data that can be packed. Similarly picking a subset of clients will influence the beam choice, as the sub-optimality of beamforming will vary with the subset of clients.

Two aspects make the integrated scheduling problem challenging: power pooling and beamforming. With regard to power pooling, in OFDMA, when multiple clients are multiplexed in the same uplink frame, they pool their powers on a smaller set of sub-channels, thereby potentially supporting higher rates per sub-channel. Batch scheduling across multiple frames enhances power pooling further—spreading a client's data across multiple frames will involve fewer sub-channels per frame, resulting in higher power pooling gain per frame. With regard to beamforming, spreading data across multiple frames for each client will maximize the power pooling gain. However, this results in more clients being scheduled in the same frame, making it harder to find a good common beam for each frame; this increases the sub-optimality of beamforming. In accordance with exemplary aspects, the scheduler's objective is to strike the right trade-off between these two components.

Figure 2:
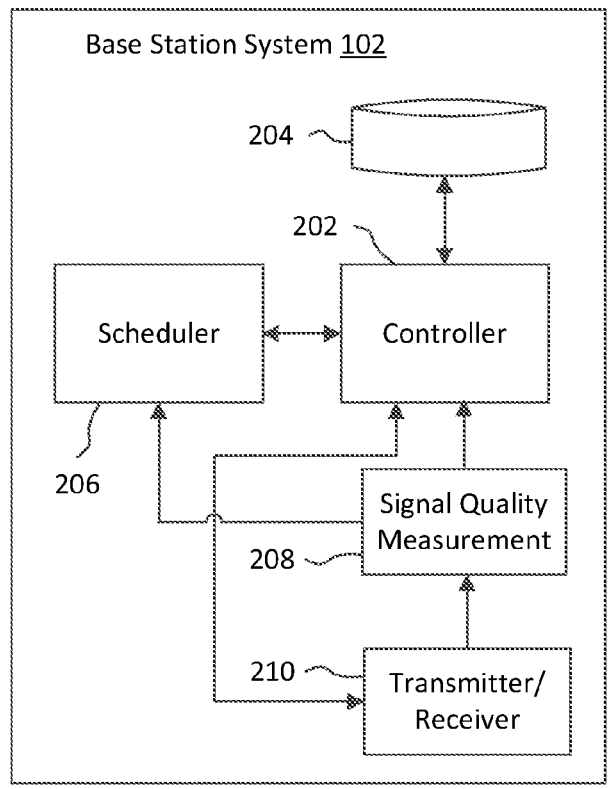
FIG. 2 is a block/flow diagram of an exemplary base station system for simultaneous determination of channel resource allocations and beam vectors for uplink frames in accordance with exemplary embodiments of the present principles.
Figure 3:
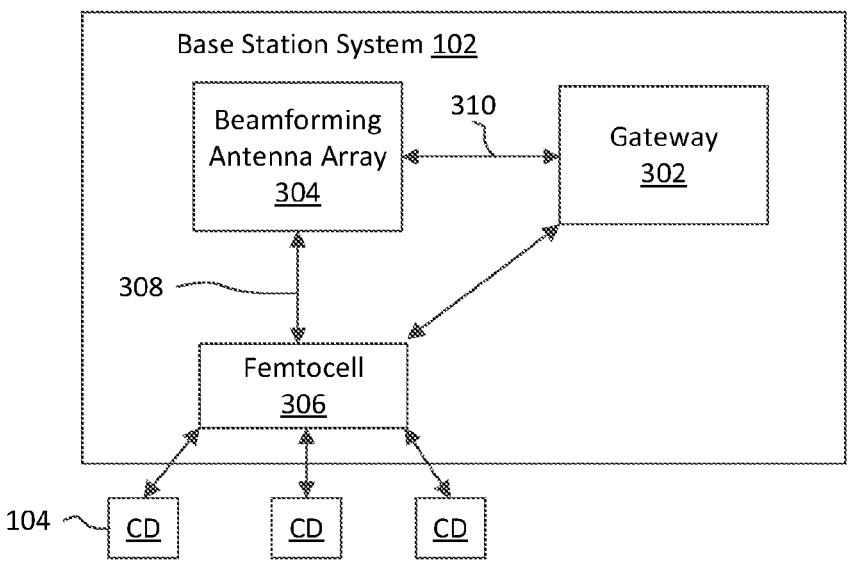
FIG. 3 is a block/flow diagram of a more specific exemplary base station system for simultaneous determination of channel resource allocations and beam vectors for uplink frames in accordance with exemplary embodiments of the present principles.

Referring now to FIGS. 2-3, more specific implementations of systems configured to simultaneously determine channel resource allocations and beam vectors for uplink frames are illustratively depicted. For example, as illustrated in FIG. 2, an exemplary base station system 102 can include a controller 202, a scheduler 206, a signal quality measurement module 208 and a transmitter/receiver 210. As discussed in more detail herein below, the transmitter/receiver 210 can be employed to communicate with client devices 104 to obtain batch information indicating the amount of data to be transmitted on the uplink, and to enable a signal quality measurement module 208 to obtain signal quality measures, such as SNRs. In addition, the controller 202, based on the signal quality measurements, can determine rate information, while the scheduler 206 can determine channel resource allocations and can select beam patterns for uplink transmissions from the client devices 104 in accordance with the methods described herein below. The system may also include a storage medium 204 that is configured to store software instructions to implement computation aspects of method embodiments described herein.

FIG. 3 illustrates one architecture in which the base station 102 can be implemented. Here, the base station 102 can be composed of a gateway 302, a beamforming antenna array 304, and a femtocell 306. Here, the transmitter/receiver 210 and the signal quality measurement module 208 can be implemented by the femtocell 306 and the antenna array 304, while the gateway 302 can implement the scheduler 206 and the controller 202 and can include the storage medium 204. It should be understood that the architecture of FIG. 3 is merely one example and that the base station system 102 can be implemented in accordance with different schemes. For example, the scheduler 206, the controller 202, and the storage medium 204 can be included in the femtocell 306, although this may incur relatively high computation overhead at the femtocell. In the architecture of FIG. 3, the femtocell measures the clients' SNRs and sends the SNRs to the gateway 302, which computes the schedule and sends the schedule to the femtocell 306. While computing the schedule, the gateway 302 can simultaneously compute the beam patterns and can apply the beam patterns to the antenna array 304 using an antenna control link 310. In turn, the femtocell 306 may include an RF connection 308 with the antenna array 304.

Figure 4:
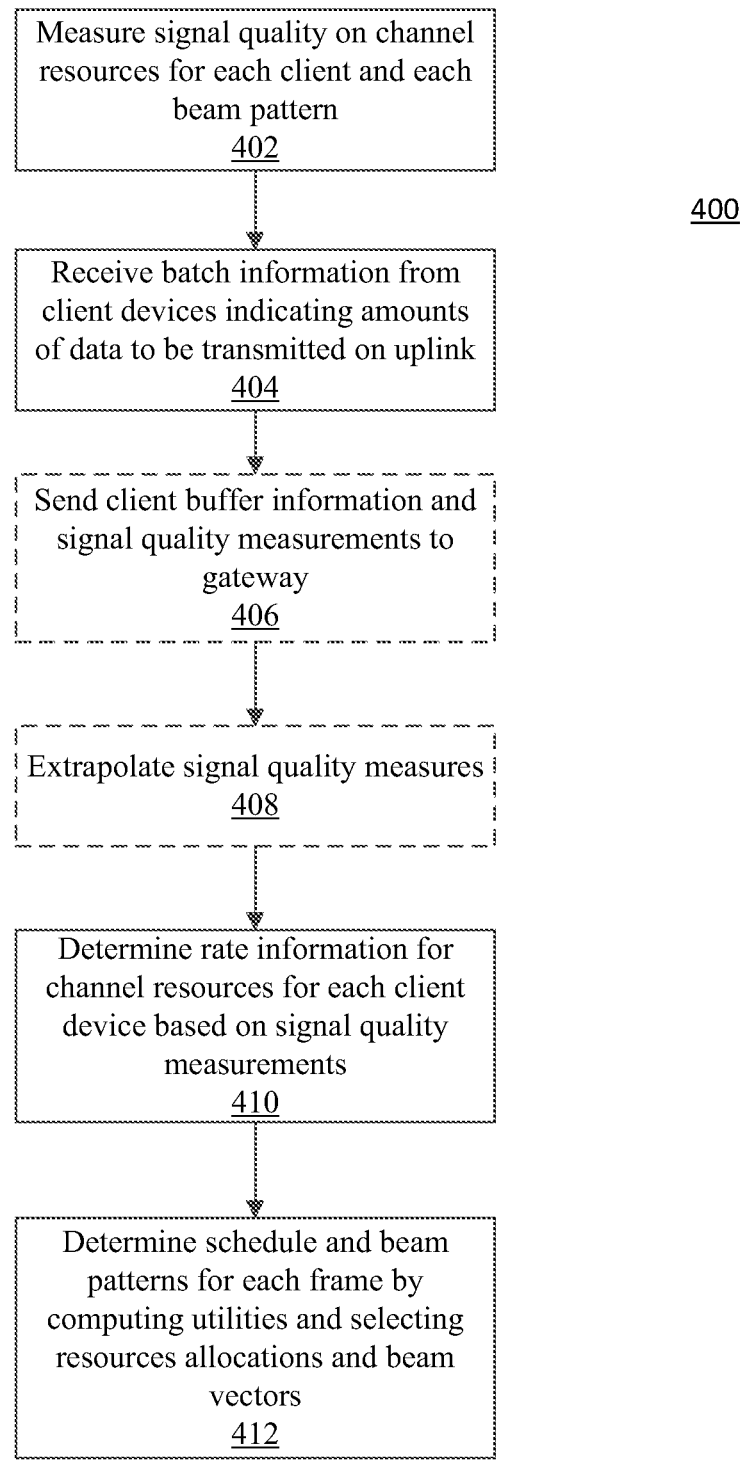
FIG. 4 is a flow diagram of a method for simultaneous determination of channel resource allocations and beam vectors for uplink frames in accordance with exemplary embodiments of the present principles.
Figure 5:
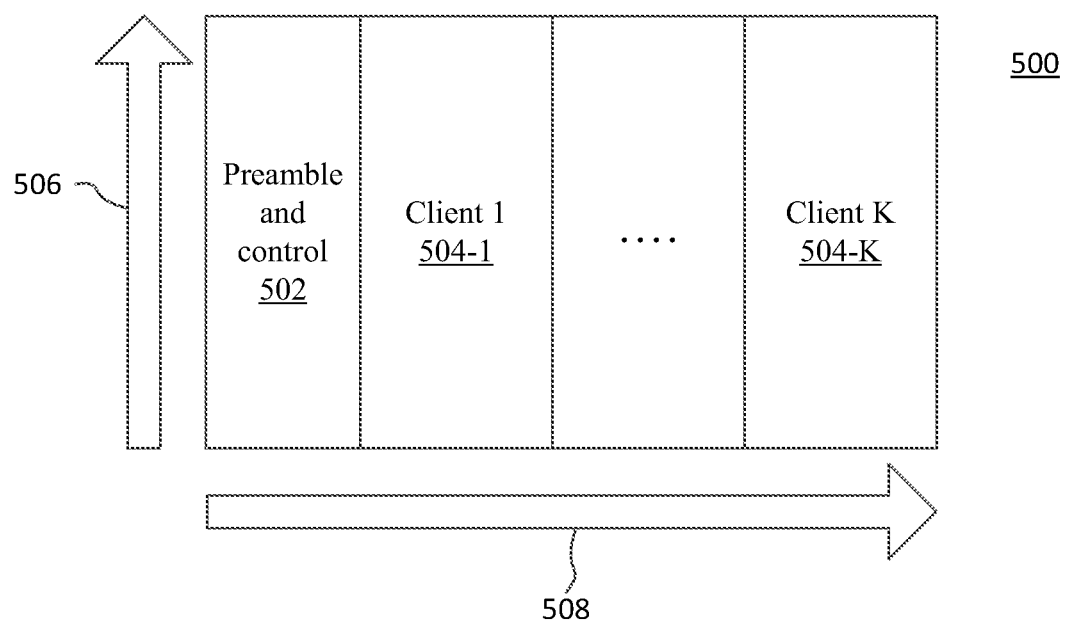
FIG. 5 is a block diagram of an exemplary uplink frame in accordance with exemplary embodiments of the present principles.

With reference now to FIG. 4, with continuing reference to FIGS. 1-3, an exemplary method 400 for simultaneously determining channel resource allocations and beam vectors for uplink frames is illustratively depicted. The method 400 can begin at step 402, at which the measurement module 208 measures signal quality on channel resources for each client device and for each of a plurality of beam vectors applied to the antenna array 304 on the uplink. For example, if there are $|\mathcal{L}|$ beam patterns, $|\mathcal{L}|$ frames are used for measurement (one for each pattern). On the uplink part of each frame, the base station (BS) schedules all the active users (client devices) such that their data or pilot signals spans all the sub-channels (number of time symbols allocated varies across users). The resulting SNR ($\rho$) for each user with each beam is measured directly at the BS and corresponds to that when power is split on all sub-channels ($\rho(i, N, l), \forall i, l$), where i denotes the client or user, where N denotes the number of available sub-channels available for allocation in a frame and where l denotes a given beam of the set of available beams $\mathcal{L}$. Thus, here, at step 402, the measurement module 208 of the base station can measure the uplink SNRs from its clients for each beam pattern of a plurality of beam patterns based on pilot signals transmitted by the clients. The measurements are conducted by allocating all sub-channels (over OFDMA symbols) to the clients in a frame. The allocation can be visualized as illustrated in FIG. 5, where a frame 500 is represented as OFDMA sub-channels 506 provided along the vertical direction and OFDMA symbols 508 provided in the horizontal direction. As shown in FIG. 5, the frame can include resources 502 dedicated for preamble and control elements, while remaining resources 504-1 to 504-K are allocated to client 1 to client K, respectively. The frame allocation illustrated in FIG. 5 is repeated for every beam pattern and the SNRs are recorded for each client device.

At step 404, the transmitter/receiver 210, which can be implemented by the femtocell 306 and the array 304, can receive batch information from client devices indicating amounts of data to be transmitted on the uplink by the client devices. For example, the base station can poll the clients to learn about the amount of data waiting to be scheduled at each client's transmit buffer for transmission on the uplink. Here, the BS can poll all its clients towards the end of the current polling interval to estimate their buffer occupancies for scheduling during the next polling interval. Note that if the total buffer occupancy of all clients is less than the total frame resources in the polling interval, then there will be under-utilization. Further, the schedules computed for the polling interval will be relevant only if the SNRs are relatively static during that interval. Hence, the polling interval is decided based on both the coherence time of SNR values (reasonably high for in-door static clients) and the typical transmission buffer size of clients.

At step 406, the femtocell 306 can optionally send the client transmit buffer (batch) information and the signal quality measurements to the gateway 302. For example, step 406 can be performed if the system 102 is not implemented entirely at the femtocell 306.

At step 408, the controller 202, which can be implemented at the gateway 302, can extrapolate measured client signal qualities (measured using all sub-channels) to account for link quality for each number of sub-channels. As indicated above, with a smaller number of sub-channels, the clients pool their transmit power on a smaller subset of the spectrum, resulting in higher power per sub-channel (an effect called power pooling). Hence, higher SNR is measured at the base station. Power pooling can be modeled with the following formula:

$$\rho\left(i, \frac{N}{\alpha}, l\right) = \rho(i, N, l) + 10\log_{10}(\alpha), \alpha \in \left[1, \frac{N}{N-1}, \ldots, \frac{N}{1}\right]$$

where $\rho(i, k, l)$ denotes the SNR measured from client i using k sub-channels with beam pattern l. This way, the gateway does not have to measure the SNR for all numbers of sub-channels, which can incur significant overhead, and can just use the formula to derive other needed SNRs from the SNR measured on all sub-channels $\rho(i, N, l)$. For example, as discussed herein below, rate tables can be determined separately to identify the best modulation and coding rate (MCS) to employ for a given SNR that yields a specific loss rate (e.g., <0.1). However, since the rate would vary with the number of sub-channels allocated (due to power pooling), a direct SNR measurement for each possible set of sub-channels for each beam ($\rho(i, k, l)$) would constitute significant overhead. Hence, based on the SNR measurement from all sub-channels ($\rho(i, N, l)$), the SNR for other subsets of sub-channels can be extrapolated, taking power pooling into account. For example, if half of the sub-channels are allocated to a user, then its resulting SNR $$\rho\left(i, \frac{N}{2}, \ell\right) = \rho(i, N, \ell) + 3 \text{(in dB)}.$$

Since the power gets distributed over ½ of sub-channels, the per sub-channel power is doubled, corresponding to +3 in dB scale.

At step 410, the controller 202 determines rate information for the channel resources for each of the client devices based on the signal quality measurements. For example, in accordance with one implementation, the gateway 302 can compute rate curves by using SNRs obtained at step 408 or 402. For example, the client SNRs can be mapped to some rate that the client can achieve. From ($\rho(i,k,l)$), one can obtain $r_i,k,l$ using a rate table. Essentially, every user (i) has a power-pooling rate curve ($g(i,k,f)$) as a function of number of sub-channels (k) and the beam chosen (l). In other words, ($g(i\,k,l)$) is the bit rate that client (i) achieves using (k) sub-channels with beam pattern. Depending on the nature of SNR-rate mapping, these curves may or may not be concave. If continuous Shannon rates are employed, then we have $$g(i, k, \ell) = k_H \cdot \log_2\left(1 + \frac{N}{k}\rho(i, N, \ell)\right),$$

which is a concave function. Here, $k_H$ denotes the bandwidth (in Hz) that corresponds to k sub-channels in the considered OFDMA system. If a discrete rate table that maps a given SNR to a modulation and coding scheme (MCS) is used, then $g(i,k,l)=k \cdot r_{i,k,l}$ results in a piece-wise linear (between SNR thresholds) function, where the mapping $$r_{i,k,\ell} \leftarrow \frac{N}{k}\rho(i, N, \ell)$$

is determined by the rate table. Here, $r_i,k,l$ denotes the number of bits that the mapped MCS can encode per-sub-channel. Depending on the rate-SNR thresholds, $g(i,k,l)$ may still be concave or not. As discussed further herein below, depending on the nature of $g(i,k,l)$ (concave or arbitrary), different algorithms will be applied. While the Shannon rate function is concave, the $g(\,)$ function with rate tables can be concave or not depending on the rate table mapping.

At step 412, the scheduler 206 can compute, based on the batch information and the rate information, utilities for allocations of the channel resources to the client devices and for the beam vectors for at least one uplink frame and can select, based on the utilities, at least one of the beam vectors and at least one of the allocations for transmission of the client data on the uplink frame(s). For example, the scheduler 206 can determine the schedule and beam patterns in different ways, depending on the type of the $g(i,k,l)$ function (for example, depending on whether $g(i,k,l)$ is concave or not). Here, the scheduler can obtain the information from the controller on whether $g(i,k,l)$ is concave. If $g(i,k,l)$ is concave, the scheduler 206 can select and apply Algorithm 1 and/or Algorithm 2, described herein below. If $g(i,k,l)$ is not concave, then the scheduler 206 can select and apply Algorithm 3, also described herein below. The integrated uplink scheduling problem can be formally expressed as the following non-linear integer program:

$$ISP: \text{Maximize} \sum_i U_i(R_i)$$

$$R_i = \sum_{j,k} x_{i,j,k}\left\{\sum_\ell y_{j,\ell} \cdot k \cdot r_{i,k,\ell}\right\} \leq B_i, \forall\, i \in \kappa$$

$$\sum_\ell y_{j,\ell} \leq 1, \forall\, j \in \mathcal{F}$$

$$\sum_{i,k} x_{i,j,k} \cdot k \leq N, \forall\, j$$

$$\sum_k x_{i,j,k} \leq 1, \forall\, i, j$$

where $x_{i,j,k}$ and $y_{j,l}$ are binary indicator (output) variables indicating the assignment of k contiguous sub-channels in frame j to user i and the assignment of beam l to frame j respectively. $\kappa$, $\mathcal{F}$, $\mathcal{L}$ indicate the set of users, frames in the batch and the available beams, respectively. The objective is to maximize the aggregate client utility, where the utility function can be any concave function (e.g., logarithmic function captures proportional fairness) of the data scheduled and can vary from one client to another. The first constraint limits the net allocation to a user to the buffer occupancy $B_i$ (in bits) of the user. Further, it indicates the inter-dependence of power pooling (# sub-channels assigned, k) and beam chosen (l) on the user's rate per sub-channel ($r_{i,k,l}$ in bits). The remaining constraints are all conservation constraints indicating the (a) assignment of a single beam per frame, (b) net allocation of sub-channels being limited to N in a frame, and (c) assignment of one contiguous set of sub-channels to a user in a frame, respectively.

Thus, after the BS obtains the signal quality information and the rate information to determine the batch schedule, it executes its algorithms. The batch schedule consists of two parts. The first part is a schedule for F−|$\mathcal{L}$| frames (|$\mathcal{L}$|<<F), where the ISP problem is solved over F−|$\mathcal{L}$| frames. The latter part is a schedule for the remaining |$\mathcal{L}$| frames, and serves as the measurement interval to obtain the SNR information for the next polling interval. Hence, in the latter part, the beam choices for the |$\mathcal{L}$| frames are fixed (one beam each) during measurement, and allocation is done only across time symbols in this example by employing the same algorithm used for solving ISP, albeit with some fixed variables. While the main purpose of the second part is measurement, one can also optimize the packing of client data that remains after the first |$\mathcal{L}$| frames, given the beam choices. Solving the ISP problem, i.e., determining data packing along with the beam choices over a given set of frames, forms the core of the solution.

For concave rate curves, the problem can be solved in accordance with Algorithm 1, provided in Table 1 below, or Algorithm 2, provided in Table 2, below.

TABLE 1

Algorithm 1 Integrated Scheduler

1: INPUT: Buffer occupancy $B_i$, $\forall i \in \mathcal{K}$ ; rates $g(i,k,l)$ , $\forall i,k \in[1,N], l \in L$
2: OUTPUT: Beam choices $1_j$, $\forall j \in \mathcal{F}$ ; per-frame user allocation $A_{ij}$, $\forall i, j$ TABLE 1-continued Algorithm 1 Integrated Scheduler 3: for f ∈ [1:| $\mathcal{F}$ |] do
4:   $O_{max}$ = 0
5:   for $l_f$ ∈[1:|L|] do
6:     $D_i \leftarrow B_i, \forall i; a_{ij} = A_{ij}, \forall i, j \in [1, f-1]$ and $a_{ij} = 0$
       $\forall i, j = f$
7:     for k = 1:N do
8:       $i^* = \arg \max_{i \in \mathcal{K}} \{U_i(\Sigma_{j=1}^{f} g(i, a_{ij}, 1_j)) + \min(g(i, a_{if}+1, 1_f)$
         $- g(i, a_{if}, 1_f), D_i)) - U_i(\Sigma_{j=1}^{f} g(i, a_{ij}, 1_j))\}$
9:       if $i^* \neq 0$ then
10:        $D_{i^*} \leftarrow D_{i^*} - \min(g(i^*, a_{i^*f} + 1, 1_f)$
           $- g(i^*, a_{i^*f}, 1_f), D_{i^*})$
11:        $a_{i^*f} \leftarrow a_{i^*f} + 1$
12:      else break endif
13:    end for
14:    $O_f = \Sigma_{i \in \mathcal{K}} U_i(\Sigma_{j=1}^{f} g(i, a_{ij}, 1_j))$
       $- U_i(\Sigma_{j=1}^{f-1} g(i, a_{ij}, 1_j))$
15:    if $O_f > O_{max}$ then
16:      $O_{max} = O_f; l_{max} = 1_f; A_{if} = a_{if}, \forall i$
17:    endif
18:  end for
19:  $1_f = 1_{max}; B_i \leftarrow B_i - \min(g(i, A_{if}, 1_f), B_i), \forall i$
20: end for In Algorithm 1, resource allocation and beam selection are considered one frame at a time in the batch, sequentially. For example, for an arbitrary number of frames, $\mathcal{F}$, the channel resources for a given frame in the batch are allocated separately from allocations of channel resources of other frames in the batch. Further, a beam vector is selected for the given frame separately from selections of beam vectors for the other frames. Algorithm 1 computes utilities for each of the beam vectors of a plurality of beam vectors and, for each of the beam vectors, assigns each subchannel of the channel resources to a respective client device yielding a highest respective utility. For example for a given frame (iteration), based on the remaining data available for the users, resource allocation is considered for every choice of the beam, and the beam yielding the best aggregate marginal utility for the frame is chosen (steps 14-16). For resource allocation within each frame given a beam (steps 6-13), Algorithm 1 assigns each sub-channel to the user who yields the highest marginal utility taking the users' buffer status into account (step 8). For concave utility functions, the allocation implemented by Algorithm 1 is indeed optimal. Further, allocation based on the marginal utility also helps multiplex multiple users in the same frame, thereby maximizing the benefits of power pooling. Once the best beam and its corresponding resource allocation are determined (steps 14-17) for the current frame, the user buffers are updated (step 19) and the procedure is repeated for the remaining frames in the batch, sequentially. In general, a given client is allocated data from a single frame. However, there are cases in which resources remaining in a given frame will accommodate only a portion of the client's data. In this case, and also in the cases in which the algorithm does not even allocate resources to the given client in the current frame, the algorithm keeps considering this client for allocation for the remaining frames (by accounting for what is already allocated to this client in the previous iterations, i.e., by updating the remaining data in the buffer). Thus, it is possible in Algorithm 1 for a client to be allocated resources across multiple frames for the transmission of its data on the uplink. Algorithm 1 has a time complexity of $O(\mathcal{F} |\mathcal{L}| \mathcal{K} |N)$, where $\mathcal{F}$ is the number of frames in the batch, $\mathcal{L}$ is the number of frames used for measuring the SNRs (one frame per beam pattern where $\mathcal{L}$ denotes the number of beam patterns), $\mathcal{K}$ is the number of clients and N is the number of sub-channels.

Table 2, below illustrates an integrated scheduling scheme in accordance with Algorithm 2, which can also be used for concave rate functions. Algorithm 2 results in better performance, but incurs additional computational complexity.

TABLE 2

Algorithm 2 Integrated Scheduler

1: INPUT: Buffer occupancy $B_i$, $\forall i \in \mathcal{K}$; rates $g(i,k,l), \forall i,k \in$
   [1,N], l ∈ L
2: OUTPUT: Beam choices $1_j$, $\forall j \in \mathcal{F}$; per-frame use allocation $A_{ij}, \forall i, j$
3: for f ∈[1:| $\mathcal{F}$ |] do
4:   $O_{max}$ = 0
5:   for $l_f$ ∈ [1:|L|]do
6:     $D_i \leftarrow B_i, \forall i; A_{ij} = 0 \forall i, j = [1, f]; k_j = N, \forall j \in [1, f]$
7:     while $k_j \neq 0, \exists j \in [1, f]$ do
8:       $(i^*, j^*) = \arg \max_{i \in \mathcal{K}, j \in [1,f]} \{U_i(\Sigma_{m=1}^{f} g(i, A_{im}, 1_m)$
         $+ \min\{g(i, A_{ij} + 1, 1_j) - g(i, A_{ij}, 1_j), D_i\})$
         $- U_i(\Sigma_{m=1}^{f} g(i, A_{im}, 1_m))\}$
9:       if $(i^*, j^*) \neq 0$ then
10:        $D_{i^*} \leftarrow D_{i^*} - \min(g(i^*, A_{i^*j^*} + 1, 1_{j^*})$
           $- g(i^*, A_{i^*j^*}, 1_{j^*}), D_{i^*})$
11:        $A_{i^*j^*} \leftarrow A_{i^*j^*} + 1; k_{j^*} \leftarrow k_{j^*} - 1$
12:      else break endif
13:    end while
14:  end for
15:  $O_f = \Sigma_{i \in \mathcal{K}} U_i(\Sigma_{j=1}^{f} g(i, A_{ij}, 1_j))$
16:  if $O_f > O_{max}$ then
17:    $O_{max} = O_f; l_{max} = 1_f$
18:  endif
19:  $1_f = 1_{max}$
20: end for The key difference between Algorithm 1 and Algorithm 2 is that while Algorithm 1 performs resource allocation within each frame in isolation, Algorithm 2 performs joint resource allocation across all frames considered in an iteration. Hence, in addition to enabling power pooling within each frame, it allows data of one or more clients to be spread across multiple frames on the uplink thereby pooling the client's power across frames as well. This in turn results in a more efficient data packing and hence, higher aggregate throughput. Specifically, when considering a beam for a given frame (f) during a considered iteration, resource allocation is performed for all frames till the current frame jointly (steps 6-13) to determine the resulting utility for the beam. In other words, to select a beam vector of a current frame, channel allocations are performed across previous frames and the current frame in a given iteration. The beam vector yielding the highest utility is then chosen for that frame (steps 15-19). Hence, each iteration of resource allocation now involves determining not only the user or client to whom a sub-channel should be allocated but also in which frame (∈[1,f], step 8). Note that once the beam is chosen for a given frame, user buffers do not have to be updated for the next frame since resource allocation will then be re-performed. Thus, for every newly considered frame, user buffers are re-initialized (step 6). Essentially, resource allocation for all frames till the one under consideration is done mainly for the purpose of determining the beam yielding the highest utility for the considered frame. The actual re-source allocation is the one that is computed during the final frame of iteration, where the allocation for all the frames in the batch is jointly determined along with the beam for that frame. In other words, a plurality of the allocations for transmission of the data on uplink frames in the batch is computed and selected from the iteration of the last frame of the uplink frames in the batch. While Algorithm 2 enables power pooling both within and across frames, the joint resource allocation across frames results in an additional time complexity of $O(|\mathcal{F}|)$ and hence a net time complexity of $O(|\mathcal{F}|^2|\mathcal{L}| \mathcal{K} N)$.

For arbitrary (non-concave) power pooling rate curves, the resource allocation and beam selection can be determined in accordance with Algorithm 3, provided in Table 3, below, which is a modified version of Algorithm 1.

TABLE 3

Algorithm 3 Integrated Scheduler

1: INPUT: Buffer occupancy $B_i$, $\forall i \in \mathcal{K}$ ; rates $g(i,k,l), \forall i, k \in [1,N], l \in L$
2: OUTPUT: Beam choices $1_j$, $\forall j \in \mathcal{F}$; per - frame use allocation $A_{ij}, \forall i, j$
3: for $f \in [1:|\mathcal{F}|]$do
4:    $O_{max} = 0$
5:    for $1_f \in [1:|L|]$do
6:       $D_i \leftarrow B_i, \forall i$; $a_{ij} = A_{ij}$, $\forall i, j \in [1, f - 1]$ and $a_{ij} = 0$
         $\forall i, j = f$
7:       Run an FPTAS for multiple-choice knapsack problem
         FA(f, $1_f$); Obtain $a_{if}$ $\forall i$
8:       $O_f = \sum_{i \in \mathcal{K}} U_i(\sum_{j=1}^{f} g(i, a_{ij}, 1_j))$
        $-U_i(\sum_{j=1}^{f-1} g(i, a_{ij}, 1_j))$
9:       if $O_f > O_{max}$ then
10:         $O_{max} = O_f$; $1_{max} = 1_f$; $A_{if} = a_{if}$, $\forall i$
11:       endif
12:    end for
13:    $1_f = 1_{max}$; $B_i \leftarrow B_i - \min(g(i, A_{if}, 1_f), B_i)$, $\forall i$
14: end for Specifically, Algorithm 3 is similar to Algorithm 1 in picking the beam yielding the highest marginal utility for each frame. However, its frame allocation for a given beam choice is significantly different. This is because if the power pooling rate curves are not concave, then allocations based on marginal utilities will not work. Hence, allocations to users in each frame should be made as a subset of continuous sub-channels instead of individual sub-channels. Thus, Algorithm 3 models the allocation problem for a given frame and beam choice (f, $1_f$) with arbitrary rate curves as the following multiple choice knapsack problem (MCKP), which is a NP-hard problem in itself.

$$FA(f, \ell_f): \text{Maximize} \sum_i \sum_{k \in N_i} u_{i,k}(f, \ell_f) x_{i,k}(f) \quad (1)$$

$$\text{s.t.} \sum_i \sum_{k \in N_i} k \cdot x_{i,k}(f) \leq N$$

$$\sum_{k \in N_i} x_{i,k}(f) = 1; \forall i$$

where $x_{ik}(f) \in \{0, 1\}$ and $N_i \in \{0, 1, \ldots, N\}$.

Essentially, there are N+1 allocations ($\mathcal{N}_i$) possible for each user or client and the MCKP problem is to pick exactly one allocation for each user or client such that the total frame allocation does not exceed N. The client's profit or utility for each allocation is computed based on the current and previous frames' allocations as follows:

$$u_{i,k}(f, \ell_f) = \sum_{i \in \mathcal{K}} U_i \left( \sum_{j=1}^{f-1} g(i, a_{ij}, \ell_j) + \min\{g(i, x_{ik}(f), \ell_f), B_i\} \right)$$

where, $a_{ij} = k$ : s.t. $x_{ikj} = 1$, $\forall i, j \in [1, f - 1]$

Note that the user's or client's buffer occupancy is automatically accommodated in its profit. Now an FTPAS (Fully Polynomial Time Approximation Scheme) based on dynamic programming can be employed to efficiently solve FA(f, $1_f$) to within (1−ε) of the optimal at a time complexity of $$O\left(\frac{|\mathcal{K}|N}{\varepsilon}\right).$$

This results in a net time complexity of $$O\left(\frac{|\mathcal{F}||\mathcal{L}||\mathcal{K}|N}{\varepsilon}\right)$$

for Algorithm 3.

The algorithms described above provide an approximation guarantee of half for both concave and arbitrary power pooling rate curves. It can be shown that their performance is close-to-optimal performance in practice, on average, as compared to their worst case guarantees of half.

After determination of the resource allocations and the selection of the beam pattern for the uplink frames in the batch, the base station 102 can transmit indications of the resource allocations to the client devices 104. In turn, the clients 104 transmit data in their buffers on the uplink frame(s) on the allocated channel and symbol resources, while the base station 102 can apply the selected beam vector to the antenna array 304 for receipt of the client data on the uplink frame(s).

Having described preferred embodiments of methods and systems for integrating batch scheduling with beamforming (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for simultaneous determination of channel resource allocations and beam vectors for uplink frames comprising:
receiving batch information from client devices indicating amounts of data to be transmitted on said uplink by said client devices;
measuring signal quality on channel resources for each of said client devices and for each of a plurality of beam vectors;
determining rate information for the channel resources for each of said client devices based on signal quality measurements; and
computing, based on said batch information and said rate information, utilities for allocations of said channel resources to said client devices and for said beam vectors for one or more uplink frames and selecting, based on said utilities, at least one of the beam vectors and at least one of said allocations for transmission of the data on said one or more uplink frames,
wherein said computing and selecting comprises selecting a respective beam vector for each of said one or more uplink frames by iteratively performing channel allocations across previous frames and a current frame in a given iteration to select a respective beam vector for a current frame; and wherein said selecting comprises selecting a plurality of the allocations for transmission of the data on said plurality of uplink frames from an iteration of a last frame of a plurality of uplink frames.

2. The method of claim 1, wherein said rate information is a concave function.

3. The method of claim 1, wherein the at least one uplink frame is a plurality of uplink frames and wherein the computing and the selecting are executed one frame at a time such that the channel resources for a given frame of the plurality of uplink frames are allocated separately from allocations of channel resources of other frames of said plurality of uplink frames and such that a beam vector of said plurality of beam vectors is selected for the given frame separately from selections of beam vectors of said plurality of beam vectors for the other frames.

4. The method of claim 3, wherein the computing comprises determining said utilities for each of said beam vectors of the plurality of beam vectors and, for each of said beam vectors of the plurality of beam vectors, assigning each subchannel of said channel resources to a respective client device yielding a highest respective utility.

5. The method of claim 1, wherein the data of at least one of said clients is allocated across multiple frames of said plurality of uplink frames.

6. The method of claim 1, wherein said rate information is a non-concave function.

7. The method of claim 6, wherein the computing comprises determining said utilities for each of said beam vectors and, for each of said beam vectors, assigning sets of subchannels of said channel resources to a respective client device yielding a highest respective utility.

8. The method of claim 7, wherein the computing and selecting comprises solving a multiple choice knapsack problem.

9. A base station system for simultaneous determination of channel resource allocations and beam vectors for uplink frames comprising:
   a receiver configured to receive batch information from client devices indicating amounts of data to be transmitted on said uplink by said client devices;
   a signal quality measurement module configured to measure signal quality on channel resources for each of said client devices and for each of a plurality of beam vectors;
   a controller configured to determine rate information for the channel resources for each of said client devices based on signal quality measurements; and
   a scheduler configured to compute, based on said batch information and said rate information, utilities for allocations of said channel resources to said client devices and for said beam vectors for one or more uplink frames and configured to select, based on said utilities, at least one of the beam vectors and at least one of said allocations for transmission of the data on said one or more uplink frames,
      wherein said scheduler is further configured to select a respective beam vector for each of said one or more uplink frames by iteratively performing channel allocations across previous frames and a current frame in a given iteration to select the respective beam vector for the current frame, and to select a plurality of the allocations for transmission of the data on said plurality of uplink frames from an iteration of a last frame of said plurality of uplink frames.

10. The system of claim 9, wherein said rate information is a concave function.

11. The system of claim 9, wherein the at least one uplink frame is a plurality of uplink frames and wherein said scheduler is further configured to execute the computation and the selection one frame at a time such that the channel resources for a given frame of the plurality of uplink frames are allocated separately from allocations of channel resources of other frames of said plurality of uplink frames and such that a beam vector of said plurality of beam vectors is selected for the given frame separately from selections of beam vectors of said plurality of beam vectors for the other frames.

12. The system of claim 11, wherein the scheduler is further configured to determine said utilities for each of the beam vectors of the plurality of beam vectors and, for each of said beam vectors of the plurality of beam vectors, to assign each subchannel of said channel resources to a respective client device yielding a highest respective utility.

13. The system of claim 9, wherein the data of at least one of said clients is allocated across multiple frames of said plurality of uplink frames.

14. The system of claim 9, wherein said rate information is a non-concave function.

15. The system of claim 14, wherein said scheduler is further configured to determine said utilities for each of the beam vectors and, for each of said beam vectors, to assign sets of subchannels of said channel resources to a respective client device yielding a highest respective utility.

16. A communication system comprising:
   a plurality of client devices configured to transmit batch information indicating amounts of data to be transmitted on a communication uplink by said client devices and to transmit pilot signals on said uplink;
   a base station configured to receive the batch information from the client devices, measure signal quality on channel resources for each of said client devices and for each of a plurality of beam vectors from said pilot signals, determine rate information for the channel resources for each of said client devices based on signal quality measurements, compute, based on said batch information and said rate information, utilities for allocations of said channel resources to said client devices and for said beam vectors for one or more uplink frames and select, based on said utilities, at least one of the beam vectors and at least one of said allocations for transmission of the data on said one or more uplink frames; and
   a scheduler configured to select a respective beam vector for each of said one or more uplink frames by iteratively performing channel allocations across previous frames and a current frame in a given iteration to select the respective beam vector for the current frame, and to select a plurality of the allocations for transmission of the data on said plurality of uplink frames from an iteration of a last frame of said plurality of uplink frames.

* * * * *